(12) United States Patent
Schroeder et al.

(10) Patent No.: US 8,770,981 B2
(45) Date of Patent: Jul. 8, 2014

(54) ACTUATION MECHANISM FOR BRAILLE DISPLAYS

(75) Inventors: David Schroeder, Aurora, IL (US);
Graham Bogda, Yorkville, IL (US);
Brendan Vishoot, Lake Zurich, IL (US)

(73) Assignee: Board of Trustees of Northern Illinois University, DeKalb, IL (US)

(*) Notice: Subject to any disclaimer, the term of this patent is extended or adjusted under 35 U.S.C. 154(b) by 210 days.

(21) Appl. No.: 12/771,336

(22) Filed: Apr. 30, 2010

(65) Prior Publication Data

US 2011/0269106 A1   Nov. 3, 2011

(51) Int. Cl.
*G09B 21/00*   (2006.01)
*B41J 3/32*   (2006.01)

(52) U.S. Cl.
USPC ......... 434/113; 434/112; 434/114; 400/109.1

(58) Field of Classification Search
USPC ................ 434/112–114; 400/109.1
See application file for complete search history.

(56) References Cited

U.S. PATENT DOCUMENTS

| | | | | |
|---|---|---|---|---|
| 4,194,190 | A * | 3/1980 | Bareau | 340/407.2 |
| 5,043,399 | A * | 8/1991 | Suzuki et al. | 525/400 |
| 5,086,287 | A * | 2/1992 | Nutzel | 340/407.1 |
| 5,675,721 | A | 10/1997 | Freedman | |
| 5,685,721 | A | 11/1997 | Decker | |
| 6,022,220 | A | 2/2000 | Haugen | |
| 6,217,338 | B1 * | 4/2001 | Tieman | 434/114 |
| 6,743,021 | B2 * | 6/2004 | Prince et al. | 434/113 |
| 2002/0106614 | A1 | 8/2002 | Prince | |
| 2007/0013662 | A1 * | 1/2007 | Fauth | 345/168 |
| 2008/0227060 | A1 * | 9/2008 | Esashi et al. | 434/113 |
| 2010/0159423 | A1 * | 6/2010 | Hashizume et al. | 434/114 |

FOREIGN PATENT DOCUMENTS

| | | |
|---|---|---|
| CA | 2216340 | 3/1999 |
| CN | 2410688 Y | 12/2000 |
| GB | 2317490 | 3/1998 |
| JP | 2006-27051 | 8/1994 |
| JP | 2008-286601 | 11/1996 |
| JP | 2010-333550 | 12/1998 |
| JP | 2000-112339 | 4/2000 |
| JP | 2003-122246 | 4/2003 |
| JP | 2004138754 A * | 5/2004 |
| JP | 2005-70716 | 3/2005 |
| JP | 2013-73465 | 4/2013 |
| WO | 2011106702 | 9/2011 |
| WO | 2011148423 | 12/2011 |
| WO | 2013179311 | 12/2013 |

OTHER PUBLICATIONS

Anson, Tony, "*Shape Memory Alloys—Medical Applications,*" Materials World, vol. 7, 12; 745-747 (1999).

(Continued)

*Primary Examiner* — Robert J Utama
*Assistant Examiner* — Sadaruz Zaman
(74) *Attorney, Agent, or Firm* — Barnes & Thornburg LLP; Alice O. Martin

(57) ABSTRACT

According to the present invention, there is provided an improved refreshable tactile display apparatus including a housing, bias compression springs, sliding blocks, pins, and a shape memory alloy wire. The sliding block is actuated by the interaction between the bias compression spring and the shape memory alloy wire. The shape memory alloy wire is then activated by current driven from a power supply in either a modulated or unmodulated fashion.

20 Claims, 3 Drawing Sheets

(56) References Cited

OTHER PUBLICATIONS

Braille Cell Dimensions; obtained at http://www.tiresias.org/research/reports/braille_cell.htm#content 1-3 (2014).
Dynalloy, Inc.—Makers of Dynamic Alloys for Electrically Driven Applications; obtained at http://www.dynalloy.com/ (2014).
Memry—From Melt to Market, obtained at http://www.memry.com/ (2014).
Pl—Leader in Precision Nano-Positioning obtained at http://www.physikinstrumente.com/en/products/index.php (2014).
Fotofab—Photo Chemical Etching and Machining obtained at http://www.fotofab.com/cmp_etching.php (2014).
Focus Braille Displays for the Blind and Visually Impaired, obtained at http://www.freedomscientific.com/products/fs/Focus-landing-page.asp (2014).
Velazquez, Ramiro, et al., "*A Low-Cost Highly-Portable Tactile Display Based on Shape Memory Alloy Micro-Actuators*," Virtual Environments, Human-Computer Interfaces, and Measurement Systems, VECIMS 121-126 (2005).
Velazquez, Ramiro, et al., "*A Compact Tactile Display for the Blind with Shape Memory Alloys*," Proceedings of the 2006 IEEE International Conference on Robotics and Automation, 3905-3910 (2006).
Velazquez, Ramiro, et al., "*Tactile Rendering with Shape-Memory-Alloy Pin-Matrix*," IEEE Transactions on Instrumentation and Measurement, vol. 57, 5 1051-1057 (2008).
Rita Yusko, "*Actuation Mechanism for Refreshable Braille Displays*," Invention Evaluator IEA100450 1-46 (2012).
Piezo Stack Actuators obtained at https://www.americanpiezo.com/standard-products/stack-actuators.html.
Arif, Shahab, "*Electronic Braille Document Reader*," Masters Thesis University of Huddersfield Repository (2013).
Velazquez, Ramiro, "*Contribution a la Conception et a la Realisation d'Interfaces Tactiles Portables pour les Deficients Visuels*," Masters Thesis l'Universite Paris 6—Pierre et Marie Curie (2006).

\* cited by examiner

ACTUATION MECHANISM FOR BRAILLE DISPLAYS

BACKGROUND OF THE INVENTION

1. Field of the Invention

The present invention generally relates to the field of refreshable tactile displays. More specifically, the present invention relates to an improved refreshable Braille display for use by the visually impaired.

2. Description of Related Art

Braille is the method that visually impaired individuals use to read and write. It consists of letters, numbers, and symbols represented as distinct patterns of dots. A refreshable Braille display is a device that is capable of refreshing or changing a pattern of Braille dots as the user reads each line from the display. Generally, such a display utilizes only one line of characters that can constantly change. Most current refreshable Braille displays use 20, 40 or 80 characters, or cells, of Braille for the line of text.

Currently available refreshable Braille displays generally use a piezoelectric (PZT) reed to actuate the dots using an electric field. While mechanically effective, this method of actuation is very expensive, has a high rate of scrapped material, and needs a significant amount of tedious hand assembly and wiring, resulting in substantial manufacturing costs. The cost of Braille displays are generally proportional to the number of cells of 8 dots that they contain. The prices of displays range anywhere from 1,600 dollars for a 20 cell display, to 7,000 dollars for a full 80 cell display. These steep costs have prevented many visually impaired individuals from having access to such displays.

As such, there exists a significant need for an improved refreshable Braille display that is constructed in a way which provides a cost-effective actuation method and greatly reduces the costs and complexity of manufacture.

SUMMARY OF THE INVENTION

The present invention provides an improved refreshable Braille display including a housing, bias compression springs, sliding blocks, pins, and a shape memory alloy wire. The sliding block is actuated by the interaction between the bias compression spring and the shape memory alloy wire. The shape memory alloy wire is then activated by current driven from a power supply in either a modulated or unmodulated fashion.

DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

The present invention provides an improved refreshable Braille display including a housing, bias compression springs, sliding blocks, pins, and a shape memory alloy wire. In the present invention, the actuation of each Braille dot requires only one moving part, the sliding block. The sliding block is actuated by the interaction between the bias compression spring and the shape memory alloy wire. The shape memory alloy wire is then activated by current driven from a power supply.

The design of the present invention is based on a wire that actuates when connected to current. In the preferred embodiment, shape memory alloy wire is used, though it should be noted that the invention is operable using any wire demonstrating similar properties. Examples of such shape memory alloy wires include nitinol and Flexinol®. It should further be noted that while the preferred embodiment employs a shape memory alloy wire, other shape memory alloy structures such as ribbons could similarly be employed. The cell of the present invention is used to actuate a single pin, and a series of such pins can be easily configured to construct an 8-pin cell or 20-pin (or more) cells, as are known to those of skill in the art.

Figure 3:
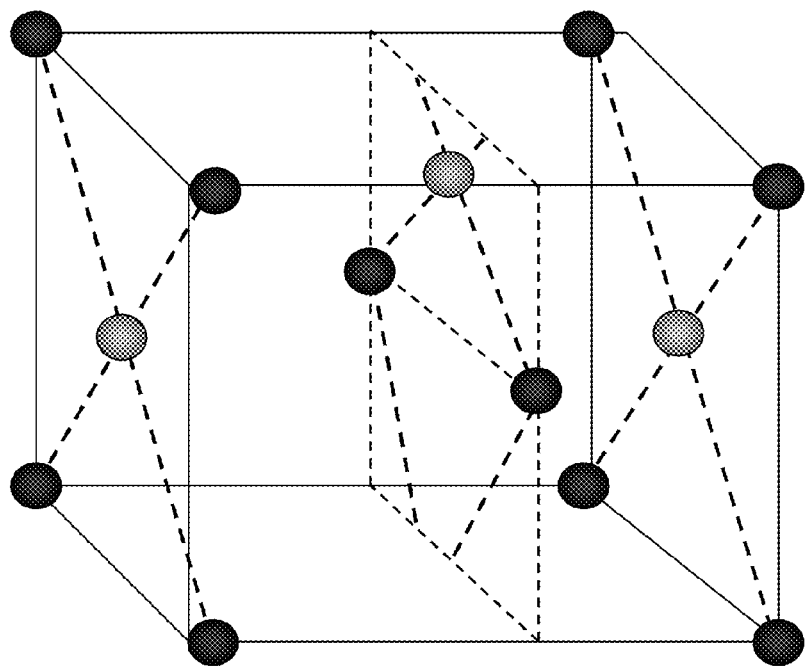
FIG. 3 represents a visual depiction of martensite and austenite phases.
Figure 3:
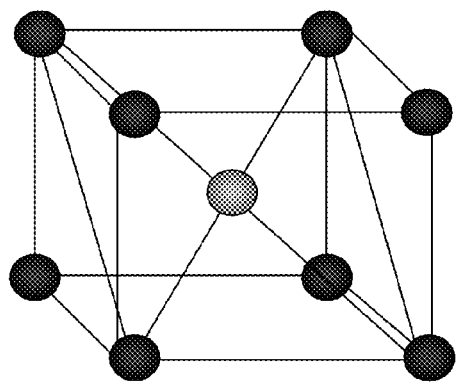
Figure 3:
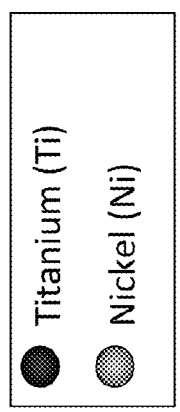

The shape memory alloy wire used in the preferred embodiment of the present invention is a material made of a nickel-titanium alloy (wherein the nickel and titanium are present in an almost perfect 50/50 ratio). The structure formed by this exact alloy allows for a martensitic transformation at a specific temperature which is reversible. The martensitic transformation takes place between the martensite phase and the austenite phase. Austenite is a crystalline phase in which a face centered cubic structure is formed. Martensite is a crystalline phase in which a body centered tetragonal structure is formed, as seen in FIG. 3. This martensitic structure is attained when austenite is cooled. This transition between the two structures, deemed the martensitic transformation, requires minuscule amounts of thermal activation energy.

The use of a shape memory alloy wire such as nitinol or Flexinol® as the primary activation method in the preferred embodiment is due to its ability to contract. This can be demonstrated by the change in its phases. Martensite has a lower density than austenite. As depicted in FIG. 3, it is apparent that martensite has a less compact structure than austenite due to its body centered tetragonal structure. When the wire, in its stable martensitic phase, is introduced to thermal energy it goes through a transformation into an austenitic phase. This austenitic phase is denser than the previous martensitic phase. This increase in density results in a decrease in the overall length of the wire. Again, it should be noted that although the preferred embodiment uses a shape memory alloy wire such as nitinol or Flexinol® as the primary activation method, other materials which display similar properties can also be implemented within the present invention.

In operation, when the pin of the present invention needs to be lowered (in order to display a Braille character), the shape memory alloy wire contracts, thereby acting against a compression spring. This position of the dot can be called its excited state. When the pin needs to be raised, the power is shut off to the wire and the compression spring returns dot to its up position, which can also be called its steady state.

When a current is sent through the shape memory alloy material, it has the ability to flex or shorten by anywhere from three to five percent of its total length. When the energy is cut from the load it then returns to its original length with some help from a small bias spring.

An electric current is applied to the shape memory alloy wire in order to actuate the present invention. In order to reduce power consumption and prevent overheating or malfunction, a pulse width modulated power supply or other power supply that can supply lower average current during the hold cycle is implemented in order to manage the electric current flowing to the shape memory alloy wire of the present invention. In the preferred embodiment, the pulse width modulator is used to supply the wire with the lowest current that will keep the shape memory alloy wire in its austenite phase, thereby reducing power consumption and reducing the time required for the pin to return to its unexcited state when power is removed.

Figure 1:
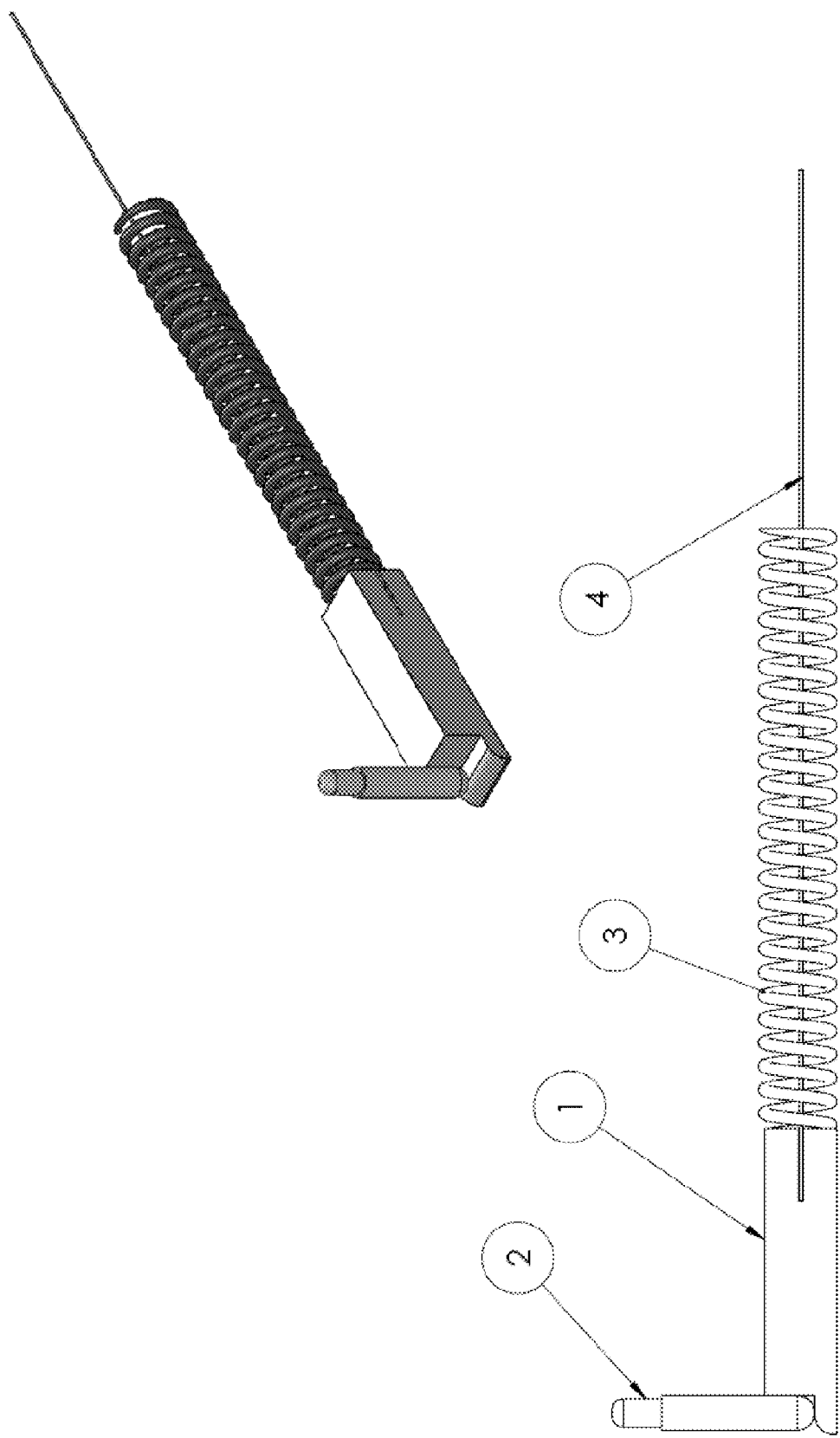
FIG. 1 represents a visual depiction of a single tactile display pin of the present invention.
Figure 2:
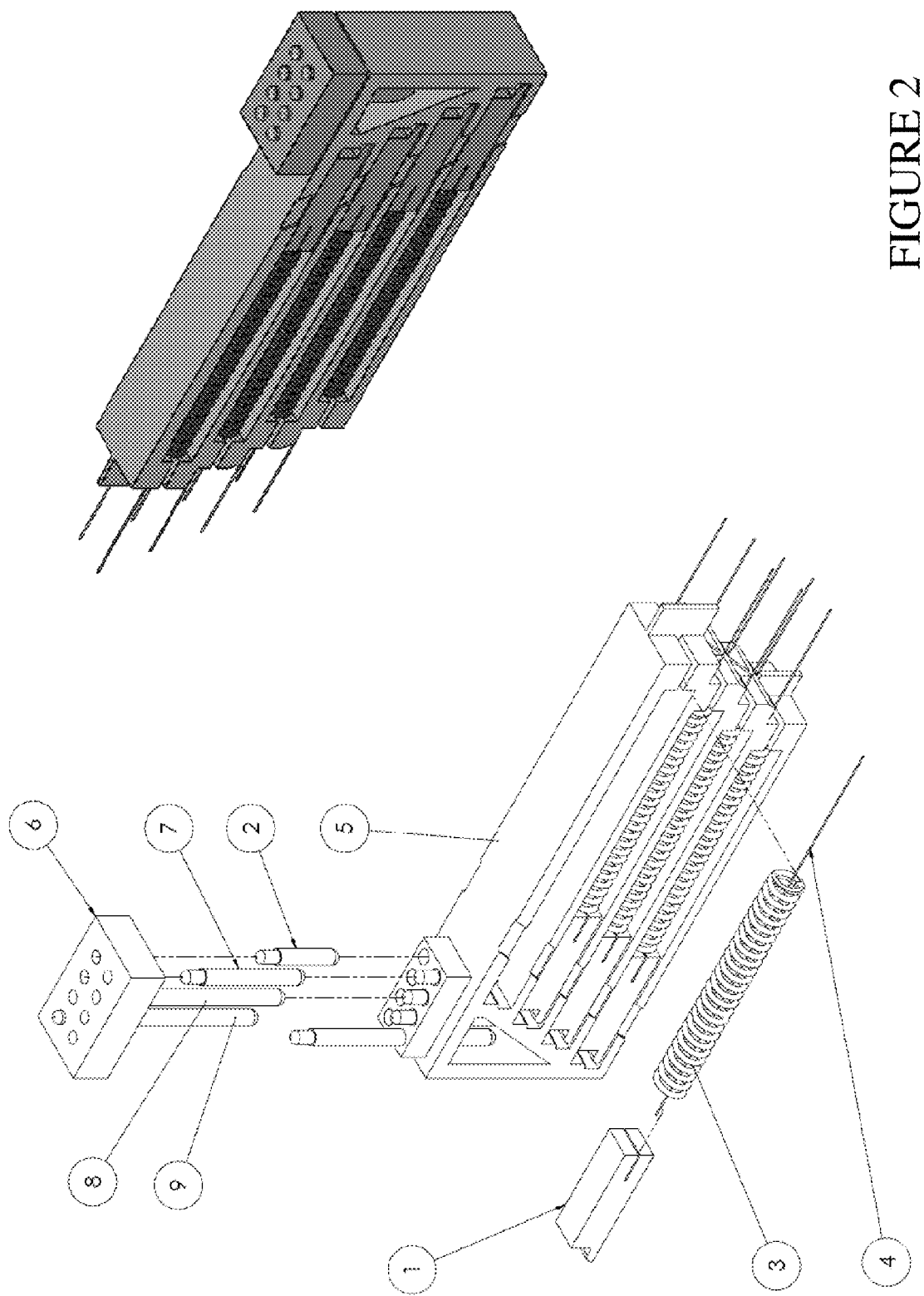
FIG. 2 represents a visual depiction of the tactile display apparatus of the present invention.

FIG. 1 depicts a single pin of the present invention in the "up" or raised position. Element (1) refers to the sliding block, (2) is the pin, (3) is the bias spring, and (4) is the shape memory alloy wire. When the wire (4) is activated, the sliding block (1) retracts and gravity makes the pin (2) fall. When the wire is deactivated, the material recovers to its original length with help from the bias spring (3). The recovery of the wire and expansion of spring forces the sliding block back to its original position. This movement of the sliding block back to its original position forces the pin upwards. The size of the wire allows for a plurality of these assemblies to sit side by side and stagger vertically forming the 8-pin cell needed for the display, as depicted in FIG. 2. The actuation comes from the contraction of the wire and from the recovery from the compression spring returning to equilibrium. Another advantage of the use of a sliding block is that it separates the forces applied by the user of the device and those required to actuate the pin. Thus neither the bias spring or the shape memory alloy wire are required to support the forces applied by the user.

The housing (5) of the present invention is preferably constructed using an acetal copolymer. In the preferred embodiment, the copolymer Hostaform® is used, which is a combination of acetal (polyoxymethylene) and PTFE (polytetrafluoroethylene). This combination produces a polymer with good mechanical properties along with low friction surfaces. It should be noted that any substance demonstrating similar physical properties could be substituted for the preferred embodiment's acetal copolymer. The acetal copolymer's low friction surfaces ensure ease of movement between the sliding block/housing interface and the pin/housing interface. Cooling holes are included, and are located near the shape memory wire, allowing for heat dissipation. Each wire used in the present invention will give off a certain amount of heat and this energy will need to be dissipated when the pins cycle.

In the preferred embodiment, the shape memory alloy wires having a 0.005 inch diameter are used, though the present invention can be modified to use wires of other diameters. Ideally, the wire diameter should allow for a low power usage which also demonstrating a significant pull force.

The pins of the present invention are preferably designed to a length were they will protrude 0.9 mm when in the steady state position and be level with the cap (6) when in the excited state position. The bottom of each pin has a profile that runs along the sliding block to aid in minimizing the force required to lift up the pin. Each pin also preferably has a ridge that touches the inner surface of the cap. Additionally, a living hinge type mechanism may be implemented to connect the assembly to the housing of the present invention.

The sliding block of the present invention is moved by the shape memory alloy wire and spring to move the pin up and down. The front of the sliding block has a profile that aids in minimizing the force on the pin while it slides underneath to bring the pin to the desired 0.9 mm height. The back portion of the sliding block preferably has a small slot cut out for the shape memory alloy wire. This back portion acts as a crimp to secure the wire and spring in place.

The bias spring of the present invention is used to move the sliding block forward and to act as a bias on the wire to help it recover faster after the wire contracts.

The present invention also includes a circuit which preferably includes two 555 timers which supplies the electric current to the shape memory alloy wire of the present invention, and also modulates the electric supply to the wire. The present invention can be embodied to operate using either modulated or unmodulated power delivery.

Obviously, many modifications and variations of the present invention are possible in light of the above teachings. It is, therefore, to be understood that within the scope of the appended claims, the invention may be practiced otherwise than as specifically described.

What is claimed is:

1. A refreshable tactile display pin comprising:
a pin that can be raised and lowered, and
a sliding block slidable to contact said pin and raise said pin, and to retract from contact with said pin and render lowerable said pin, said sliding block connected to a single bias compression spring for biasing said sliding block into contact with said pin, said sliding block being additionally connected to a single wire having shape memory properties that upon activation shortens in length in opposition to said bias compression spring, for causing said sliding block to retract from contact with said pin;
wherein the single compression spring and single wire extend from only a first side of the sliding block.

2. The display pin of claim 1, wherein said wire is defined as a nitinol wire.

3. The display pin of claim 1, wherein said wire is activated with an electric current.

4. The display pin of claim 1, further including a power supply for providing an electric current to the wire.

5. The display pin of claim 1, further including a pulse modulator for modulating the electric current applied to the wire.

6. A refreshable tactile display apparatus comprising: a plurality of tactile display pins as described in claim 1, and a housing for containing the plurality of pins.

7. The display apparatus of claim 6, wherein said wire is defined as a nitinol wire.

8. The display apparatus of claim 6, wherein said wire is activated with an electric current.

9. The display apparatus of claim 6, further including a power supply for providing an electric current to the wire.

10. The display apparatus of claim 6, further including a pulse modulator for modulating the electric current applied to the wire.

11. The display apparatus of claim 6, wherein said housing is constructed from an acetal copolymer.

12. The display apparatus of claim 6, wherein said housing includes cooling holes for heat dissipation.

13. A refreshable tactile display pin comprising:
a pin that can be raised and lowered, and
a sliding block slidable to contact said pin and raise said pin, and to retract from contact with said pin and render lowerable said pin, wherein the sliding block comprises:
a first end;
a bias compression spring connected to only the first end of the sliding block for biasing the sliding block into contact with the pin;
a wire having shape memory properties connected to only the first end of the sliding block; and
a second end opposite the first end;

wherein the wire moves the second end of the sliding block into and out of contact with the pin.

14. The display pin of claim 13, wherein said wire is defined as a nitinol wire.

15. The display pin of claim 13, wherein said wire is activated with an electric current.

16. The display pin of claim 15, further including a pulse modulator for modulating the electric current applied to the wire.

17. A refreshable tactile display apparatus comprising: a plurality of tactile display pins as described in claim 13, and a housing for containing the plurality of pins.

18. The display apparatus of claim 17, wherein said wire is defined as a nitinol wire.

19. The display apparatus of claim 17, wherein said housing is constructed from an acetal copolymer.

20. The display apparatus of claim 17, wherein said housing includes cooling holes for heat dissipation.

* * * * *